United States Patent [19]
Sakakibara et al.

[11] Patent Number: 5,218,541
[45] Date of Patent: Jun. 8, 1993

[54] AUTOMATIC TRANSMISSION CONTROL SYSTEM RESPONSIVE TO ROAD SURFACE CONDITIONS

[75] Inventors: Shiro Sakakibara, Anjo; Yukihiro Osada, Chiryu, both of Japan

[73] Assignee: Aisin AW Co., Ltd., Japan

[21] Appl. No.: 633,344

[22] Filed: Dec. 27, 1990

[30] Foreign Application Priority Data
Dec. 31, 1989 [JP] Japan .................................. 1-343460

[51] Int. Cl.⁵ .............................................. B60K 31/00
[52] U.S. Cl. .................................. 364/424.1; 74/866; 364/426.03
[58] Field of Search ........... 364/424.1, 426.01, 426.02, 364/426.03; 74/866

[56] References Cited
U.S. PATENT DOCUMENTS 4,779,696 10/1988 Harada et al. ............. 364/426.01 X
5,062,049 10/1991 Taylor ............................. 364/424.1

Primary Examiner—Parshotam S. Lall
Assistant Examiner—Edward Pipala
Attorney, Agent, or Firm—Lorusso & Loud

[57] ABSTRACT

A control unit of automatic transmission for vehicle with continuous transmission mechanism which controls torque ratio of a transmission portion of the transmission mechanism by a target torque ratio comprises a road surface condition detecting portion which detects road surface condition according to input from low-μ road detecting means and a shift judging processing portion which corrects the target torque ratio with a road surface condition coefficient according to input from the road surface condition detecting portion and which outputs shift command according to the corrected target torque ratio and the actual torque ratio.

9 Claims, 11 Drawing Sheets $T^*max$ : MAXIMUM TARGET TORQUE RATIO
$T^*min$ : MINIMUM TARGET TORQUE RATIO
$\mu$ : ROAD SURFACE CONDITION COEFFICIENT
K : TARGET TORQUE RATIO CORRECTED VALUE
Tp : ACTUAL TORQUE RATIO
V : VEHICLE SPEED
$\dot{e}$ : TARGET SHIFT SPEED
X : (TARGET − ACTUAL) TORQUE RATIO
$\dot{e}min$ : LOW SPEED SHIFT SPEED SET VALUE

AUTOMATIC TRANSMISSION CONTROL SYSTEM RESPONSIVE TO ROAD SURFACE CONDITIONS

BACKGROUND OF THE INVENTION

The present invention relates to a control unit of an automatic transmission for a vehicle with a continuous transmission mechanism, and more particularly, to a transmission control unit of the continuous transmission mechanism.

When a vehicle is on a road low friction surface (hereinafter "low-$\mu$"), such as a road on which snow is accumulated, a frozen road, or a gravel road, it often occurs that the driving force of a driving wheel of the vehicle exceeds the frictional force of the tire gripping the road surface and that the vehicle skids.

Conventionally, various kinds of means have been proposed to prevent a vehicle which is running from skidding. Particularly, in an automatic transmission in which a continuous transmission is used as a transmission portion, an anti-skid unit which is disclosed in Japanese Laid-Open No. SHO 60-192155 has been proposed. In this anti-skid unit, a method is adopted that skidding of a driving wheel is detected and the torque ratio of the continuous transmission is controlled and a shift is made so that the driving force may be lowered until the driving wheel ceases to skid.

However, according to the anti-skid unit as above referred to, as the shift is made after skid of a driving wheel is detected when the vehicle starts to move or when the vehicle is moving on a low-$\mu$ road, there is a problem that there is a predetermined length of a time-lag until the shift ratio reaches a required value and skidding during that period can not be prevented.

Further, when the vehicle starts to move, as the transmission is in an under-drive state and a large torque acts on the driving wheels, skidding is likely to occur all the more compared with a case when the vehicle moves at a constant speed. However, with the shift after detecting a skid in the above manner, a smooth starting of movement can not be expected.

SUMMARY OF THE INVENTION

Accordingly, an object of the present invention is to provide a control unit of an automatic transmission for a vehicle which enables a vehicle to smoothly start to move by inputting in advance the state of a low-$\mu$ road to a control unit of a continuous transmission mechanism.

Another object of the present invention is to input the state of the low-$\mu$ road automatically to the control unit.

Further object of the present invention is to make it possible to input the state of the low-$\mu$ road manually to the control unit.

A still further object of the present invention is to control a continuous transmission mechanism without overloading the transmission portion.

Briefly described, with a control unit of an automatic transmission for a vehicle of the present invention of the above arrangement, the road surface condition is inputted from a low-$\mu$ road detecting means, a road surface condition coefficient is set by a road surface condition determining means, a target torque ratio is corrected according to the road surface condition coefficient from the road surface condition determining means by a shift judgement processor, the direction of shift is determined according to the corrected target torque ratio and the actual torque ratio, and a shift command is outputted. Therefore, the shift position can be set according to the condition of a low-$\mu$ road so that driving force which acts on a driving wheel of a vehicle may be adapted to the road surface condition. Particularly, when a vehicle starts to move, a smooth start without skidding can be obtained.

With a control unit of an automatic transmission for a vehicle of the present invention wherein the low-$\mu$ road detecting means is a low-$\mu$ road sensor, the condition of a low-$\mu$ road can be automatical inputted to the control unit.

Further, with a control unit of an automatic transmission for a vehicle of the present invention wherein the low-$\mu$ road detecting means is a low-$\mu$ selector the condition of a low-$\mu$ road is input manually in accordance with judgement by by the driver.

Still further, with a control unit of an automatic transmission for a vehicle of the present invention wherein the shift judgement processor is provided with means for setting a low-speed target shift speed, when a vehicle starts to move, the transmission can be controlled in advance and a shift ratio corresponding to the input for a low-$\mu$ road can be set without overloading the transmission.

BRIEF DESCRIPTION OF THE DRAWINGS

A better understanding of the invention may be had by reference to the following description of preferred embodiments when taken in conjunction with the accompanying drawings, in which.

DESCRIPTION OF THE PREFERRED EMBODIMENTS

A preferred embodiment of the present invention is now described with reference to the drawings. Before a detailed description of a control unit, the overall arrangement of an automatic transmission which includes the control unit will first be briefly described.

Figure 2:
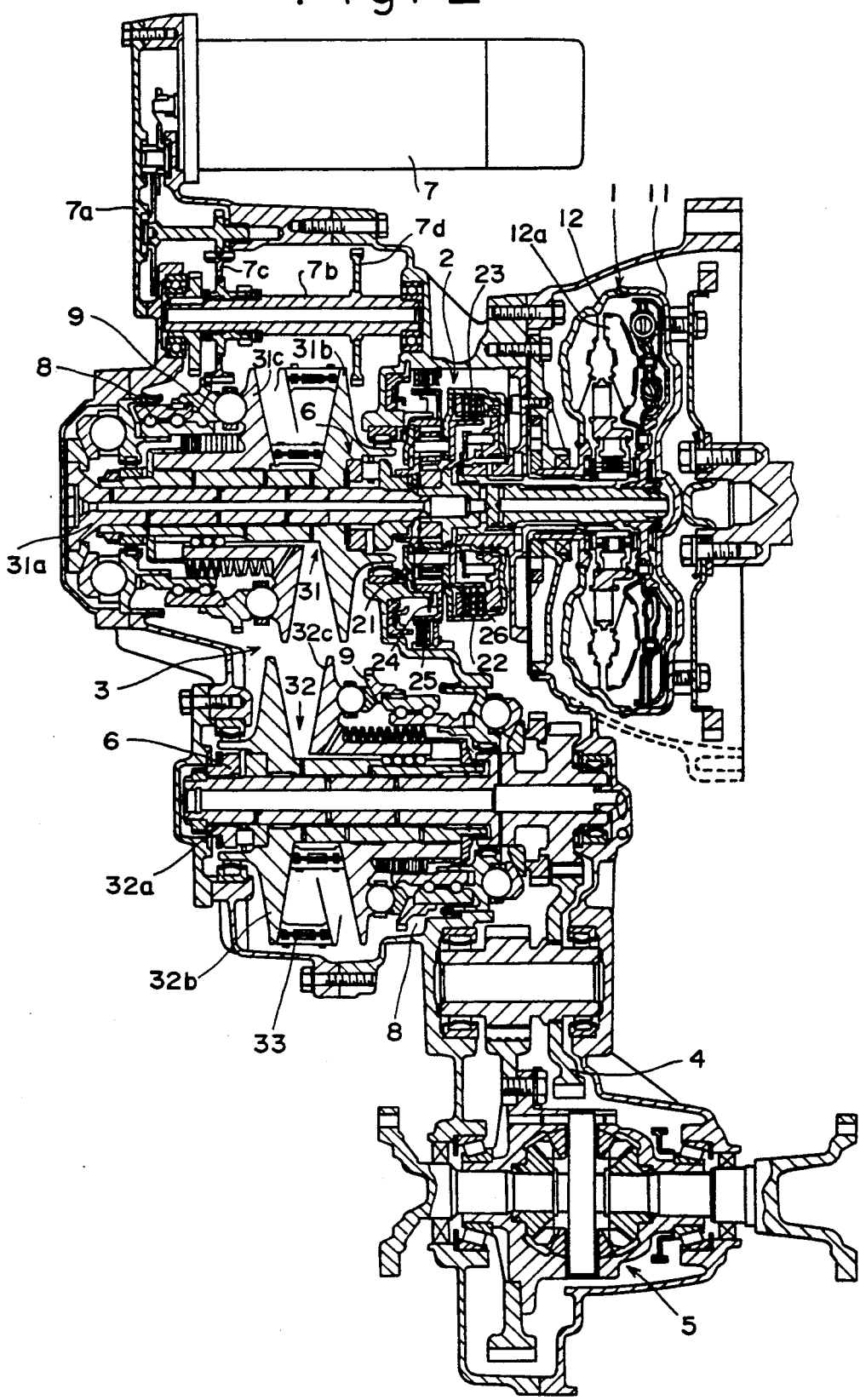
FIG. 2 is a sectional view of a continuous transmission mechanism.

As shown in a sectional view of FIG. 2, the transmission comprises a torque converter 12 with a lock up clutch 11 as a starting unit 1, a dual planetary gear unit 2 as a forward-backward switch unit which converts output of a turbine 12a of the torque converter 12 into an input to a sun gear 21, and a continuous V belt transmission (hereinafter referred to as CVT) 3 as a continuous transmission mechanism which converts output of a carrier 22 of the dual planetary gear unit 2 into an input to a primary sheave 31 and which effects continuous shifting with the primary sheave 31, a secondary sheave 32 which is in parallel with the primary sheave 31, and a V belt 33 between the primary and the secondary sheaves 31 and 32. The transmission is arranged so that the output of the CVT 3 may be outputted to a differential gear 5 through a counter gear 4. A multiple disc clutch (hereinafter referred to as a forward clutch) 23 is interposed between the carrier 22 of the dual planetary gear unit 2 and the sun gear 21. In the same way, a multiple disc brake (hereinafter referred to as a reverse brake) 25 is interposed between the ring gear 24 and the case of the transmission. When the forward clutch 23 is engaged, the sun gear 21 and the carrier 22 are directly coupled. When the reverse brake 25 is actuated, the orbital motion of a planetary gear 26 due to fixing of the ring gear 24 is output as a reverse rotation of the carrier 22. The outputted rotation in the opposite direction is transmitted to a shaft 31a of the primary sheave 31 in the shift ratio of 1:1.

Thrust cam mechanisms 6 of a roller cam system are provided between the carrier 22 and a fixed sheave 31b and between a shaft 32a of the secondary sheave 32a and a fixed sheave 32b. The arrangement is for the purpose of providing thrust according to the torque to the fixed sheaves 31b and 32b, increasing or decreasing the pressing power between the primary sheave 31 and the V belt 33 and between the V belt 33 and the secondary sheave 32 according to the load, and preventing slipping between the primary sheave 31 and the V belt 33 and between the V belt 33 and the secondary sheave 32. A motor 7 for shift of the CVT 3 is attached above the unit. The rotation of the motor 7 is transmitted to two gears 7c and 7d of a shift shaft 7b through a reduction gear 7a, and further, transmitted to collars 9 which are supported by the case of the transmission through ball screw mechanisms 8. Then, axial movement of the collars 9 is transmitted to movable sheaves 31c and 32c through ball bearings. Accordingly, in this unit, shift operation of the CVT 3 is conducted not by a hydraulic control system but by the motor for CVT shifting.

Figure 3A:
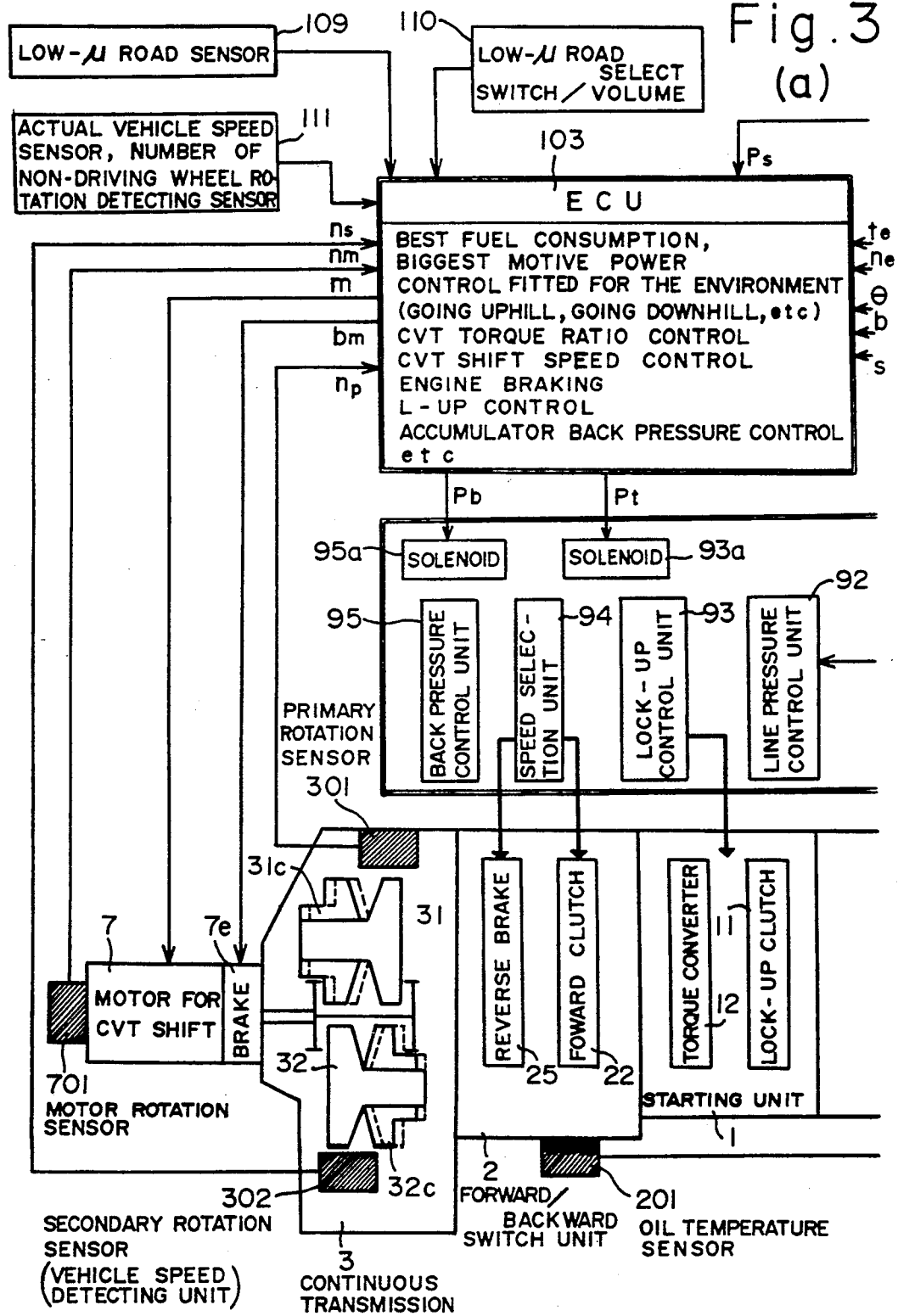
FIGS. 3(a) and 3(b) are the control block diagram of a system.
Figure 3:
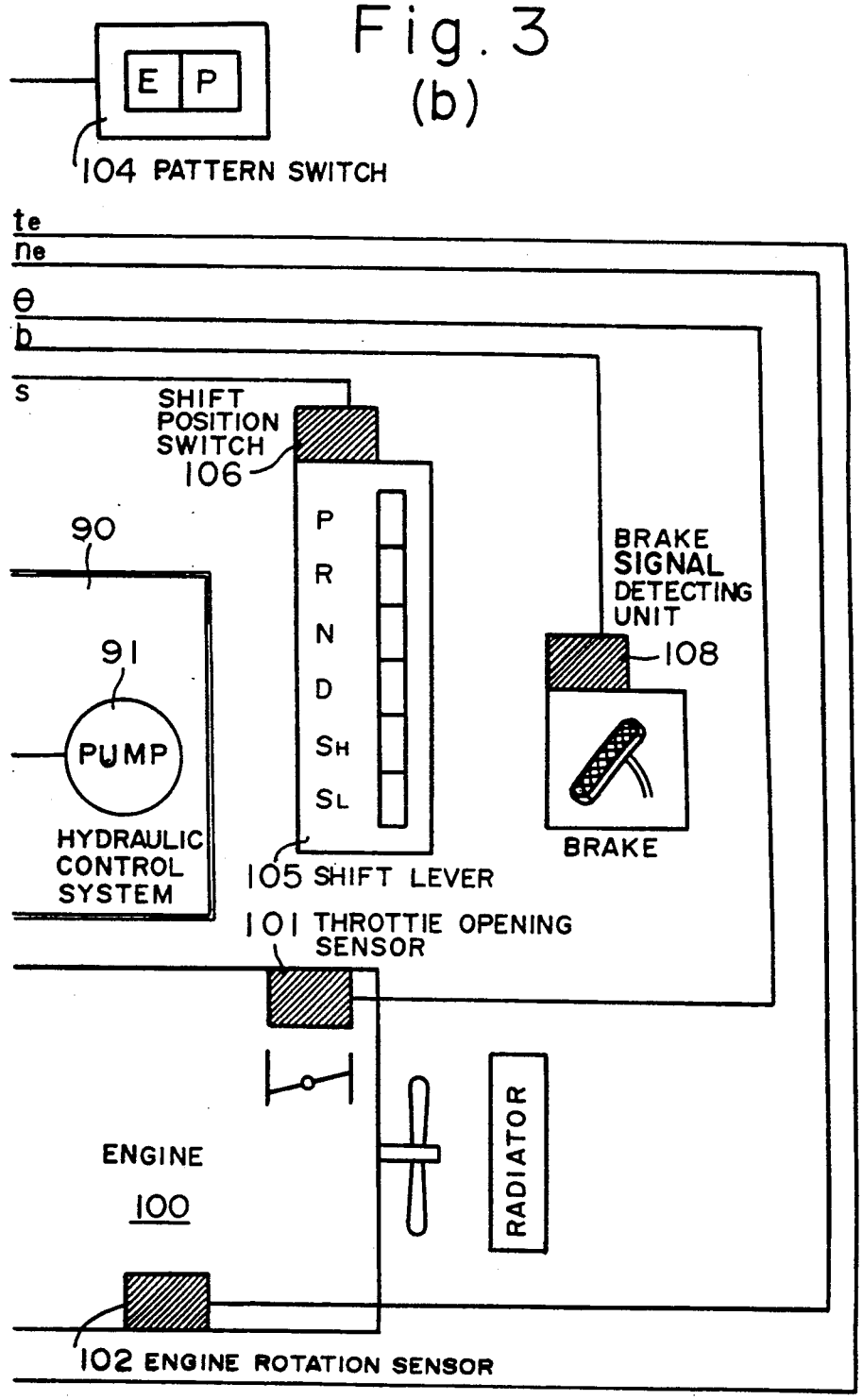

The block diagram of the system in FIG. 3, shows the transmission mounted on a vehicle. The starting unit 1 of the transmission is connected with an engine 100 and the CVT 3 of the transmission is connected with an axle shaft through the differential gear as referred to above.

A throttle opening sensor 101 and an engine rotation sensor 102 are disposed at the engine 100. These sensors are respectively connected with an electronic controlling unit (hereinafter referred to as ECU) 103, and a throttle opening $\theta$ signal and an engine rotational $n_e$ signal are outputted to the ECU 103, respectively.

Both of the lock up clutch 11 and the torque converter 12 of the starting unit are controlled by a hydraulic control system 90.

The forward/backward switch unit 2 is, as above referred to, provide with the forward clutch 22 and the reverse brake 25. These are also controlled by the hydraulic control system 90 and control of change-over between going forward and going backward is attained. The forward/backward switch unit 2 is further provided with an oil temperature sensor 201. The oil temperature sensor 201 is connected with the ECU 103 in the same way, and oil temperature $t_e$ signal of hydraulic oil in the transmission is outputted to the ECU 103.

The torque ratio established by the CVT 3 is varied by the motor 7 for CVT shifting which appropriately controls the movable sheaves 31c and 32c of both sheaves 31 and 32. A brake 7e for supporting the motor 7 for CVT shifting is provided as well. The operations of the motor 7 for CVT shifting and of the brake 7e are controlled according to control signals m and $b_m$, respectively, from the ECU 103. Furthermore, the motor 7 for CVT shifting is provided with a motor rotation sensor 701. The motor rotation sensor 701 outputs a number of rotation $n_m$ signal of the motor 7 for CVT shift to the ECU 103. Further, a primary rotation sensor 301 and a secondary rotation sensor 302, respectively, are connected with the ECU 103. These sensors are provided adjacent to the circumference of the corresponding sheaves 31 and 32, respectively. The sensors detects the number of rotation of the sheaves 31 and 32, and outputs the number of rotation $n_p$ and $n_s$ signals to the ECU 103.

The hydraulic control system 90 comprises a pump 91, a line pressure control unit 92, a lock up control unit 93, a speed selection unit 94, and a back pressure control unit 95. The lock up control unit 93 controls the lock up clutch 11 by being switched on or off or duty-controlled by a solenoid for locking up drive signal $P_l$ from the ECU 103. The speed selection unit 94 controls the forward clutch 22 and the reverse brake 25. Further, the back pressure control unit 95 controls the back pressure of accumulators of the forward clutch 22 and the reverse brake 23 by being switched on or off or duty-controlled by a solenoid for controlling back pressure drive signal $P_b$ from the ECU 103.

A pattern select unit 104 is for selectively setting ECONOMY mode E or POWER mode P. Its pattern signal $P_s$ is outputted to the ECU 103.

A shift lever 105 for automatic shift is provided with a shift position switch 106. The shift position switch 106 detects the shift position P, R, N, D, $S_H$, or $S_L$ of the shift lever and outputs its shift position signal s to the ECU 103.

A foot brake 107 is a brake which brakes the vehicle. The brake 107 is provided with a brake signal detecting means 108. A brake signal b from the brake signal detecting means 108 is inputted to the ECU 103 in the same way.

The transmission is further provided with a low-$\mu$ road sensor 109. The sensor 109 is for the purpose of watching a road surface and comprises a temperature detecting means which detects road surface temperature without contacting and an optical image recognizing means, or a means which is a combination thereof. A low-$\mu$ road signal from the low-$\mu$ road sensor 109 is inputted to the ECU 103 in the same way.

A low-μ road select switch or volume 110 is a means for manually setting a road surface condition coefficient according to the road surface condition. A signal from the low-μ road select switch or volume 110 is inputted to the ECU 103 in the same way.

Further, it may be that an actual vehicle speed sensor 111 is provided additionally. The sensor 111 detects the number of rotation of a wheel which is not a driving wheel, etc. A signal from the sensor 111 can be inputted to the ECU 103 in the same way.

Accordingly, the ECU 103 controls the hydraulic control system 90 and the CVT 3 by outputting the solenoid for locking up drive signal $P_l$, the solenoid for controlling back pressure drive signal $P_b$, the motor for CVT shift control signal m, and the brake for supporting motor signal $b_m$, respectively, according to the throttle opening $\theta$ signal, oil temperature $t_e$ signal, the number of engine rotation $n_e$ signal, the number of motor rotation $n_m$ signal, the number of primary sheave rotation $n_p$ signal, the number of secondary sheave rotation $n_s$ signal, the shift position signal s, the pattern signal $P_s$, the brake actuation signal b, the low-μ road signal, and if added, the number of non-driving wheel rotation signal.

Here, a detailed arrangement of the ECV 103 of the transmission of the arrangement as referred to above is described with reference to a functional block diagram of FIG. 1.

Figure 1:
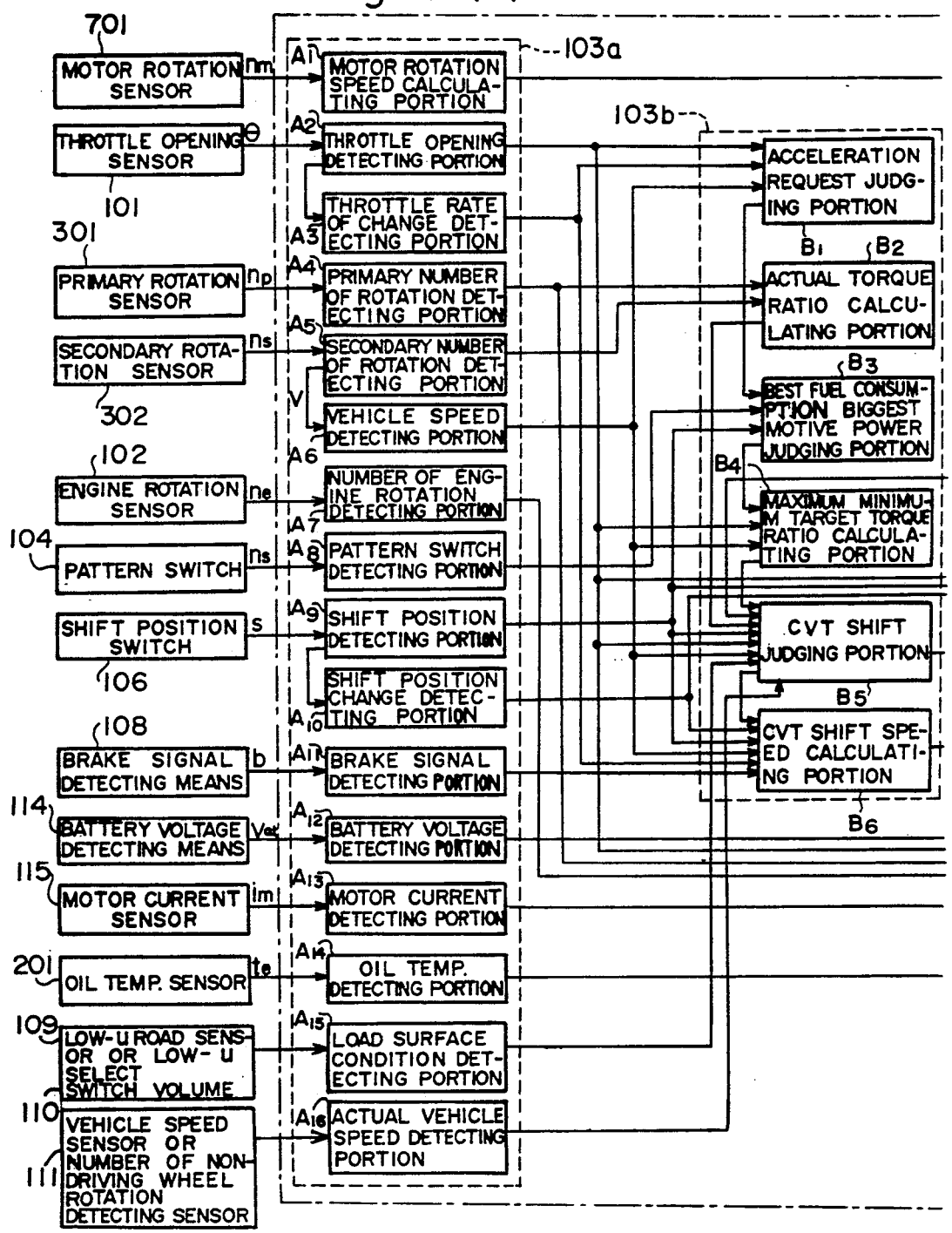
FIGS. 1(a) and 1(b) are a functional block diagram which shows an embodiment of a control unit of an automatic transmission for a vehicle of the present invention.
Figure 1B:
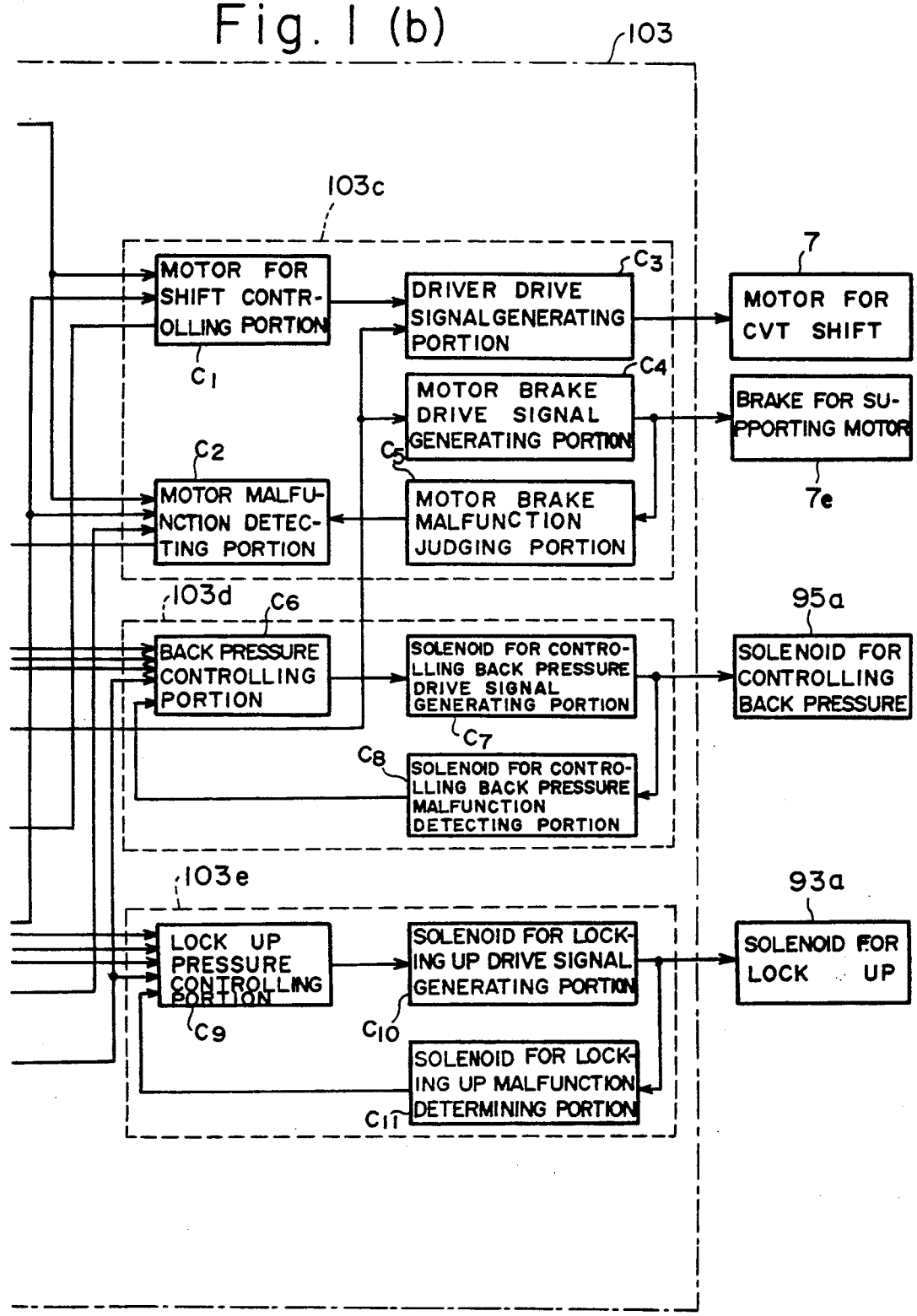

As shown in FIG. 1, the ECV 103 comprises an input portion 103a, an operational portion 103b, and output portions 103c through 103e.

First of all, the input portion 103a comprises a motor rotation speed calculating portion $A_1$ to which the number of motor rotation $n_m$ signal from the motor rotation sensor 701 is inputted a throttle opening detecting portion $A_2$ to which the throttle opening $\theta$ signal from the throttle opening sensor 101 is inputted, a throttle rate of change detecting portion $A_3$ which detects a rate of change of the throttle according to the throttle opening $\theta$ signal inputted to the throttle opening detecting portion $A_2$ taking soft timer into consideration, a primary number of rotation detecting portion $A_4$ to which the number of primary sheave rotation $n_p$ signal from the primary rotation sensor 301 is inputted, a secondary number of rotation detecting portion $A_5$ to which the number of secondary sheave rotation $n_s$ signal from the secondary rotation sensor 302 is inputted, a vehicle speed detecting portion $A_6$ which detects vehicle speed V according to the number of secondary sheave rotation $n_s$ signal inputted to the secondary number of rotation detecting portion $A_5$, a number of engine rotation detecting portion $A_7$ to which the number of engine rotation $n_e$ signal is inputted from the engine rotation sensor 102, a pattern switch detecting portion $A_8$ to which the pattern signal $P_s$ of the ECONOMY mode E or the POWER mode P is inputted from the pattern switch 104, a shift position detecting portion $A_9$ to which the shift position signal s is inputted from the shift position switch 106, a shift position change detecting portion $A_{10}$ which detects the shift position according to the shift position signal s inputted to the shift position detecting portion $A_g$, a brake signal detecting portion $A_{11}$ to which the brake actuation signal b is inputted from the brake signal detecting means 108, a battery voltage detecting portion $A_{12}$ to which a battery voltage signal $V_{at}$ is inputted from a battery voltage detecting means 114, a motor current detecting portion $A_{13}$ to which a motor current $i_m$ signal is inputted from a motor current sensor 115, an oil temperature detecting portion $A_{14}$ to which the oil temperature $t_s$ signal is inputted from the oil temperature sensor 201, a road surface condition detecting portion $A_{15}$ to which the road surface condition signal is inputted from the low-μ road sensor 109 and/or the low-μ road select switch or volume 110, and additionally, an actual vehicle speed detecting portion $A_{16}$ to which a signal from the vehicle speed sensor or number of non-driving wheel rotation detecting sensor 111.

The operational portion 103b comprises an acceleration request judging portion $B_1$, an actual torque ratio calculating portion $B_2$, a judging portion $B_3$ of the least fuel consumption/the biggest motive power, a calculating portion $B_4$ of the maximum/the minimum target torque ratio, a CVT shift judging portion $B_5$, and a CVT shift speed calculating portion $B_6$.

The output portion comprises a control signal output portion 103c of the motor 7 for CVT shift and the brake 7e for supporting motor, a back pressure control signal output portion 103d of the solenoid 95a for controlling back pressure which controls the back pressure to be given to the accumulator of the hydraulic control system, and a lock up control signal output portion 103e of the solenoid 93a for locking up.

Further, the control signal output portion 103c of the motor 7 for CVT shift and the brake 7e for supporting motor comprises a motor for shift controlling portion $C_1$, a motor malfunction detecting portion $C_2$, a driver drive signal generating portion $C_3$, a motor brake drive signal generating portion $C_4$, and a motor brake malfunction judging portion $C_5$.

The back pressure control signal output portion 103d of the accumulator of the hydraulic control system comprises a back pressure controlling portion $C_6$, a solenoid for controlling back pressure drive signal generating portion $C_7$, and a solenoid for controlling back pressure malfunction detecting portion $C_8$.

The lock up control signal output portion 103e comprises a lock up pressure controlling portion $C_9$, a solenoid for locking up drive signal generating portion $C_{10}$, and a solenoid for locking up malfunction detecting portion $C_{11}$.

In the ECU 103 of the arrangement as referred to above, the acceleration request judging portion $B_1$ makes a predetermined judgement according to the detected values of a throttle opening $\theta$ from the throttle opening detecting portion $A_2$, a throttle opening rate of change from the throttle rate of change detecting portion $A_3$, and a vehicle speed V from the vehicle speed detecting portion $A_6$, and then outputs the result of the judgement to the judging portion $B_3$ of the least fuel consumption/the biggest motive power.

A signal from the primary number of rotation detecting portion $A_4$ and a signal from the secondary number of rotation detecting portion $A_5$ are inputted to the actual torque ratio calculating portion $B_2$. The actual torque ratio calculating portion $B_2$ calculates the actual torque ratio according to the signals and the result of the calculation is outputted to the CVT shift judging portion $B_5$.

A signal from the acceleration request judging portion $B_1$, a signal from the pattern switch detecting portion $A_8$, and a signal from the shift position detecting portion $A_9$, respectively, are inputted to the judging portion $B_3$ of the least fuel consumption/the biggest motive power. The judging portion $B_3$ of the least fuel consumption/the biggest motive power judges whether to control by the least fuel consumption characteristic or to control by the biggest motive power characteristic according to the signals and outputs the result of the judgement to the calculating portion $B_4$ of the maximum/the minimum target torque ratio.

A signal from the judging portion $B_3$ of the least fuel consumption/the biggest motive power, a signal from the throttle opening detecting portion $A_2$, and a signal from the vehicle speed detecting portion $A_6$ are inputted to the calculating portion $B_4$ of the maximum/the minimum target torque ratio. The calculating portion $B_4$ of the maximum/the minimum target torque ratio calculates the maximum and the minimum value of the target torque ratio according to the signals and outputs the result of the calculation to the CVT shift judging portion $B_5$.

A signal from the calculating portion $B_4$ of the maximum/the minimum target torque ratio, a signal from the motor malfunction detecting portion $C_2$, a signal from the actual torque ratio calculating portion $B_2$, a signal from the shift position detecting portion $A_9$, a signal from the throttle opening detecting portion $A_2$, a signal from the vehicle speed detecting portion $A_6$, a signal from the road surface condition detecting portion $A_{15}$, and a signal from the actual vehicle speed detecting portion $A_{16}$, if any, are inputted to the CVT shift judging portion $B_5$. The CVT shift judging portion $B_5$ judges whether to change or not the actual torque ratio of the CVT portion according to these signals, and outputs its shift signal to the CVT shift speed calculating portion $B_6$, the driver drive signal generating portion $C_3$, and the motor brake drive signal generating portion $C_4$.

A signal from the CVT shift judging portion $B_5$, a signal from the shift position change detecting portion $A_{10}$, a signal from the shift position detecting portion $A_9$, a signal from the vehicle speed detecting portion $A_6$, a signal from the throttle rate of change detecting portion $A_3$, and a signal from the brake signal detecting portion $A_{11}$ are inputted to the CVT shift speed calculating portion $B_6$. The CVT shift speed calculating portion $B_6$ calculates a CVT shift speed which realizes the required shift feeling at the present time according to these signals, and outputs the result of the calculation to the motor for shift controlling portion $C_1$.

The motor for shift controlling portion $C_1$ outputs a signal to the driver drive signal generating portion $C_3$ according to a signal from the motor rotation speed calculating portion $A_1$, a signal from the battery voltage detecting portion $A_{12}$, and a signal from the CVT transmission speed calculating portion $B_6$. By this signal from the motor for shift controlling portion $C_1$, in order to realize the required shift of the CVT portion, the direction of the rotation of the motor and the voltage applied to the motor are controlled.

The motor malfunction detecting portion $C_2$ detects malfunction, for example, excess current, saturation of speed, and locked state, of the motor according to signals from the motor rotation speed calculating portion $A_1$, battery voltage detecting portion $A_{12}$, motor current detecting portion $A_{13}$, and the motor brake malfunction judging portion $C_5$, and outputs the detection signal to the CVT shift judging portion $B_5$.

Figure 12:
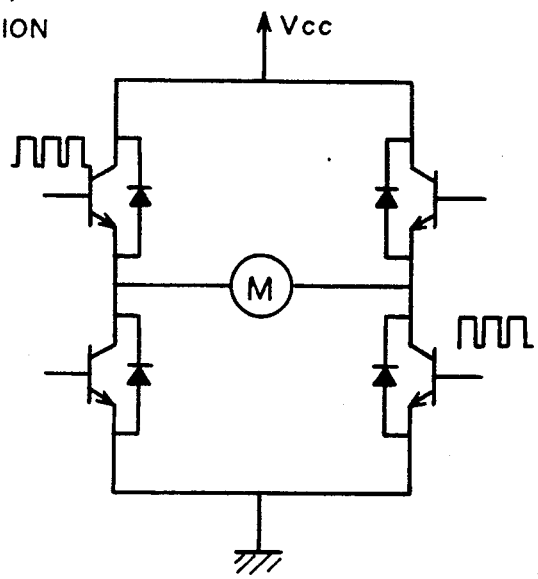
FIG. 12 is a circuit diagram for a driver of the control unit.

The driver drive signal generating portion $C_3$ changes the duty ratio given to a driver for driving motor (see FIG. 12) and outputs a signal to the motor 7 for CVT shift when a shift command is given to the motor for CVT shift according to a signal from the motor for shift controlling portion $C_1$ and a signal from the CVT judging portion $B_5$.

The motor brake drive signal generating portion $C_4$ outputs a signal so that the brake 7e for supporting motor may be released when a shift command is given to the motor 7 for CVT shift according to a signal from the CVT shift judging portion $B_5$. The signal from the motor brake drive signal generating portion $C_4$ is outputted also to the motor brake malfunction judging portion $C_5$.

The motor brake malfunction judging portion $C_5$ watches the brake operating voltage according to a signal from the motor brake drive signal generating portion $C_4$, detects malfunction such as disconnection or short circuit, and outputs the signal to the motor malfunction detecting portion $C_2$.

The back pressure controlling portion $C_6$ outputs a control signal to the solenoid for controlling back pressure drive signal generating portion $C_7$ so that the shaft feeling may be controlled when the shift is made from N to D or from N to R according to a signal from the throttle opening detecting portion $A_2$, a signal from the shift position detecting portion $A_9$, a signal from the shift position change detecting portion $A_{10}$, a signal from the oil temperature detecting portion $A_{14}$, and a signal from the solenoid for controlling back pressure malfunction judging portion $C_8$.

The solenoid for controlling back pressure drive signal generating portion $C_7$ outputs a solenoid drive signal to the solenoid 95a for controlling back pressure and also outputs a signal to the solenoid for controlling back pressure malfunction judging portion $C_8$ according to a signal from the back pressure controlling portion $C_6$.

The solenoid for controlling back pressure malfunction judging portion $C_8$ detects malfunction such as disconnection and short circuit of the solenoid 95a for controlling back pressure and outputs the signal to the back pressure controlling portion $C_6$ according to a signal from the solenoid for controlling back pressure drive signal generating portion $C_7$.

The lock up pressure controlling portion $C_9$ determines whether the lock up is on, off, or duty according to a signal from the throttle opening detecting portion $A_2$, a signal from the primary number of rotation detecting portion $A_4$, a signal from the number of engine rotation detecting portion $A_7$, a signal from the oil temperature detecting portion $A_{14}$, and a signal from the solenoid for locking up malfunction judging portion $C_{11}$ and outputs the result to the solenoid for locking up drive signal generating portion $C_{10}$.

The solenoid for locking up drive signal generating portion $C_{10}$ outputs a solenoid drive signal to the solenoid 93a for locking up and also outputs a signal to the solenoid for locking up malfunction judging portion $C_{11}$ according to a signal from the lock up pressure controlling portion $C_9$.

The solenoid for locking up malfunction judging portion $C_{11}$ detects malfunction such as disconnection or short circuit of the solenoid for locking up according to a signal from the solenoid for locking up drive signal generating portion $C_{10}$ and outputs its signal to the lock up pressure controlling portion $C_9$.

Next, a control flow of the ECU 103 of the above arrangement is described below.

Figure 4:
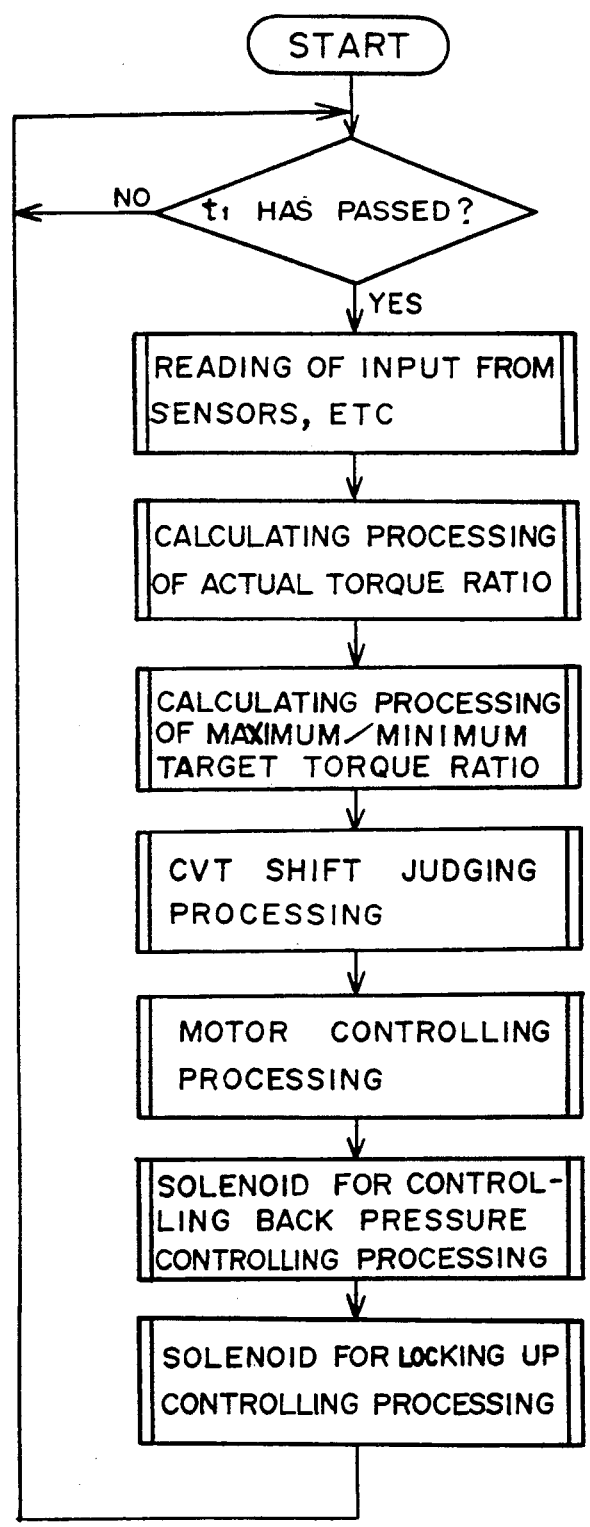
FIG. 4 is the flow chart which shows a main flow of processing by the control unit.

As shown in a main flow of FIG. 4, first, writing processing is conducted in which signals from the sensors are inputted as digital signals that can be processed in the ECU every predetermined lenth of time $t_1$.

At the next step, the actual torque ratio $T_p$ is calculated based on the number of rotation of the primary sheave and the number of rotation of the secondary sheave ($T_p = n_p/n_s$).

Then, at the next step, the maximum/the minimum value of the target number of rotation is calculated based on the actual throttle opening, vehicle speed, and mode at the present time (POWER mode P or ECONOMY mode E), and from this value and the vehicle speed, the maximum/the minimum value of the target torque ratio are calculated.

Next, CTV shift judging processing is performed to judge what shift speed should be and whether the shift should be in the up shift direction or in the down shift direction according to the actual torque ratio, the target torque ratio, the vehicle speed, the shift position, the brake actuation signal, and the brake for supporting motor signal.

Figure 5:
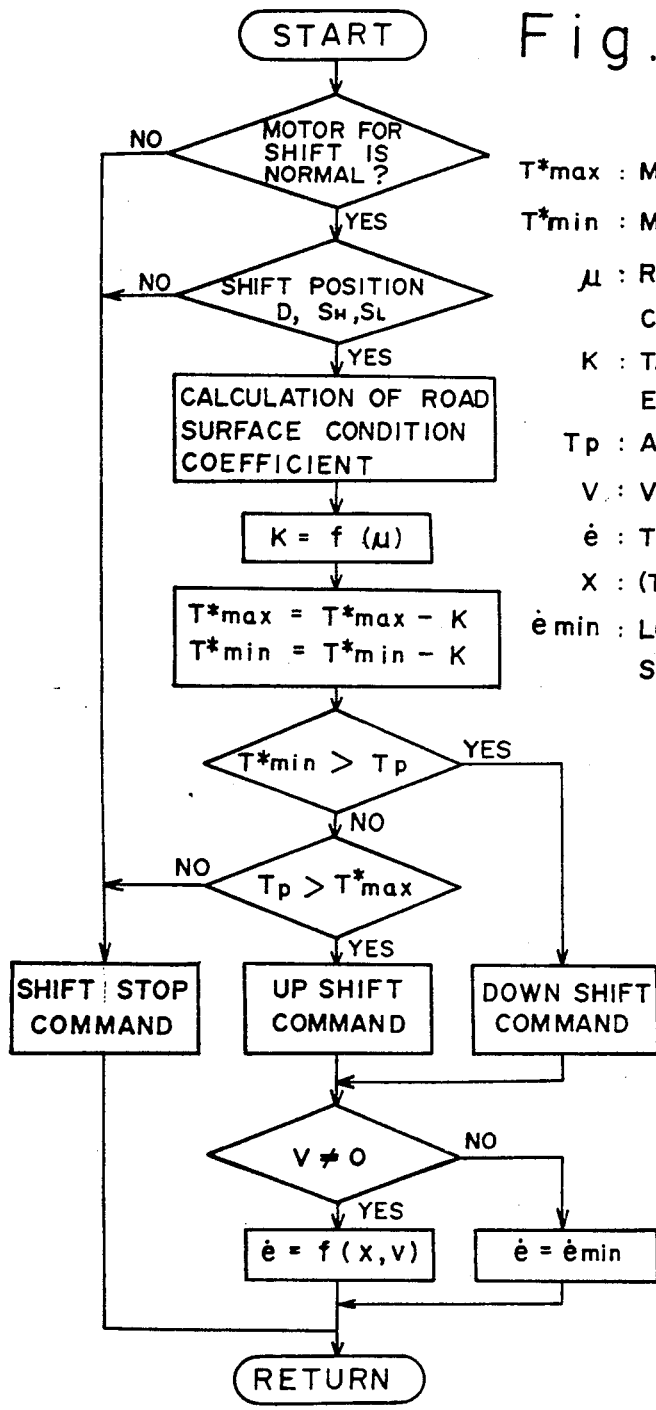
FIG. 5 is a flow chart which shows CVT shift judging processing of the control unit.

This processing is shown in a flow chart of FIG. 5. When the motor for CVT shifting 7 is not normal, if the shift position is not D, $S_H$, or $S_L$, further processing is not conducted and a shift stop command is outputted.

Figure 6:
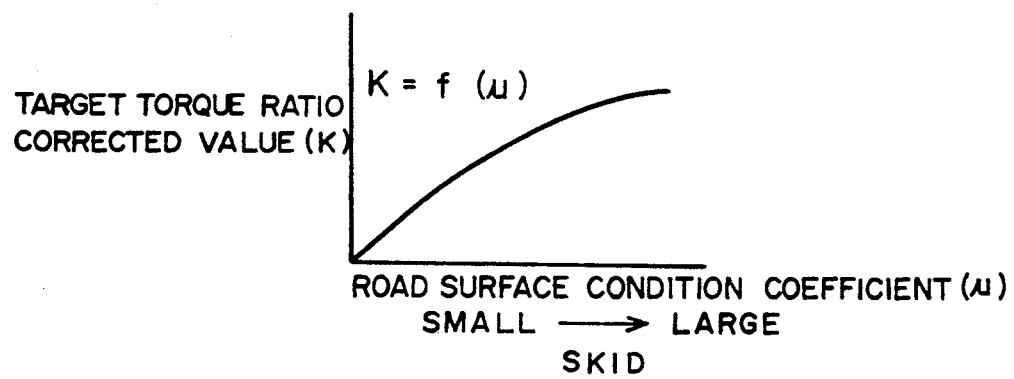
FIG. 6 is a graph which shows a relationship between the road surface condition coefficient and the corrected value of target torque ratio when a low-$\mu$ road sensor or a low-$\mu$ selector is used.
Figure 7:
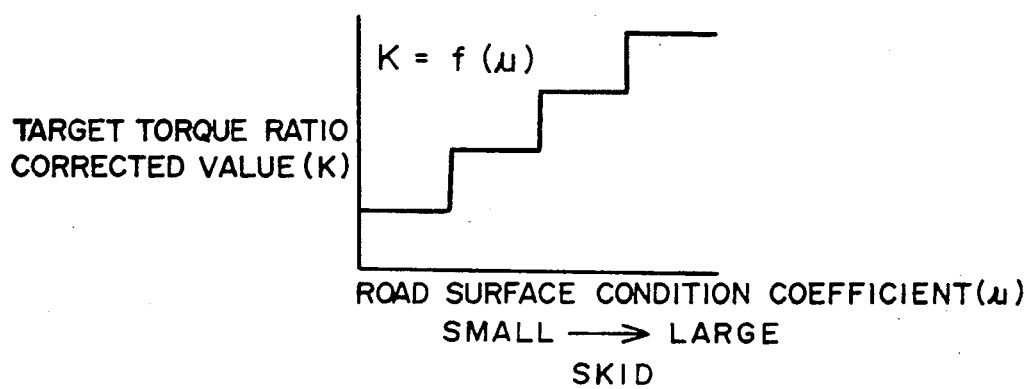
FIG. 7 is a graph which shows a relationship between the road surface condition coefficient and the corrected value of target torque ratio when a low-$\mu$ road select switch is used.

Next, the road surface condition coefficient is calculated according to the detected value of the low-$\mu$ road sensor and/or the value set by the low-$\mu$ road select switch/volume. After the road surface condition coefficient $\mu$ is calculated, the target torque ratio corrected value K is calculated with a function $K = f(\mu)$ shown in a graph of FIG. 6 or 7. FIG. 6 shows a function in the case of the low-$\mu$ road sensor or the low-$\mu$ road select volume. FIG. 7 shows a function in the case of the low-$\mu$ road select switch.

After the target torque ratio corrected value K is calculated in this way, the corrected value is used to revise the maximum the minimum value of the target torque ratio which has been already calculated. That is, the target torque ratio corrected value K is deducted from the maximum value $T*_{max}$ of the target torque ratio, the target torque ratio corrected value K is deducted from the minimum value $T*_{min}$ of the target torque ratio, and they are shifted to the up shift side by the value of the corrected value.

At the next step, different commands are outputted depending on the position of the actual torque ratio with respect to the corrected maximum/minimum values of the target torque. First, when the actual torque ratio $T_p$ is between the corrected maximum value and the corrected minimum value of the target torque ratio, a shift stop command is outputted as a matter of course. When the actual torque ratio is below the corrected minimum value $T*_{min}$ of the target torque ratio, that is, $T*_{min} > T_p$, a down shift command is outputted. On the other hand, when the actual torque ratio $T_p$ is above the corrected maximum value $T*_{max}$ of the target torque ratio, that is, $T_p > T*_{max}$, an up shift command is outputted.

Figure 8:
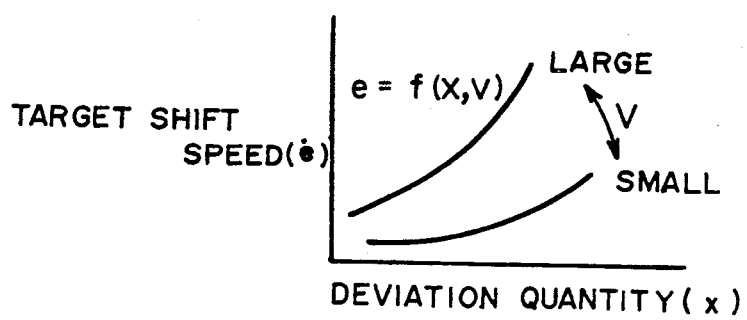
FIG. 8 is a graph which shows a relationship between the vehicle speed, the deviation, and the shift speed as map data.

When the up shift command or the down shift command is outputted, a target shift speed is set according to the vehicle speed V at the following steps. That is, when the vehicle speed $V \neq 0$, the target shift speed ė is defined by a function $ė = f(x, V)$ as shown in FIG. 8. On the other hand, when the vehicle speed $V = 0$, a processing to set the target shift speed ė as a predetermined low speed shift speed set value $ė_{min}$ is conducted. This is because, in a continuous transmission of the arrangement as referred to above, the transmission mechanism is in a stopped state when the vehicle speed is 0, and, if normal shift operation is made in this state, a great extent of load acts on the transmission and its actuator portion and a bad effect is caused.

Then, returning to the main flow of FIG. 4, further, in order to realize the shift speed calculated by the CVT shift judging processing, motor controlling processing to control a motor drive signal is conducted according to the number of motor rotation and the battery voltage at the present time.

Figure 9:
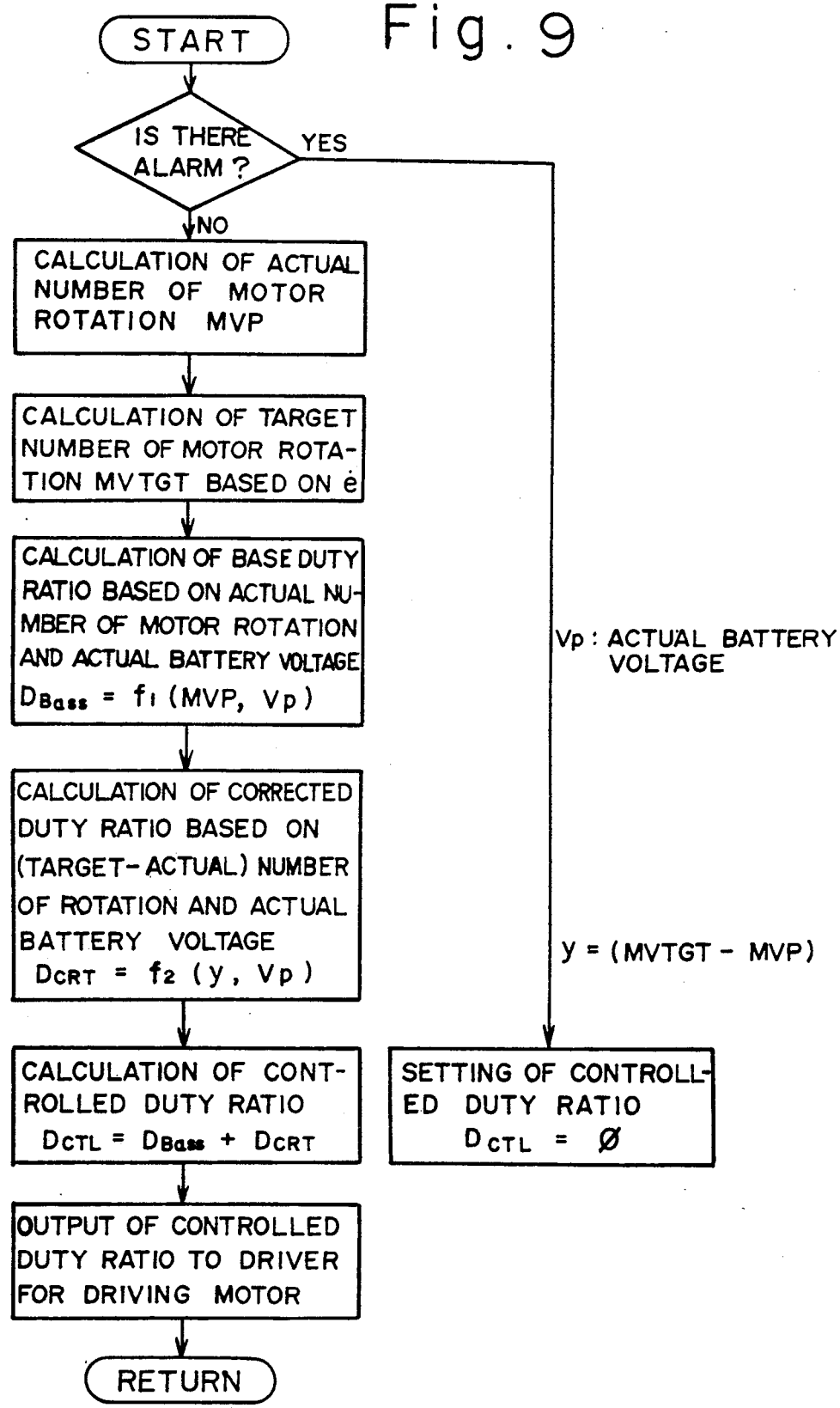
FIG. 9 is a flow chart for motor control.
Figure 11:
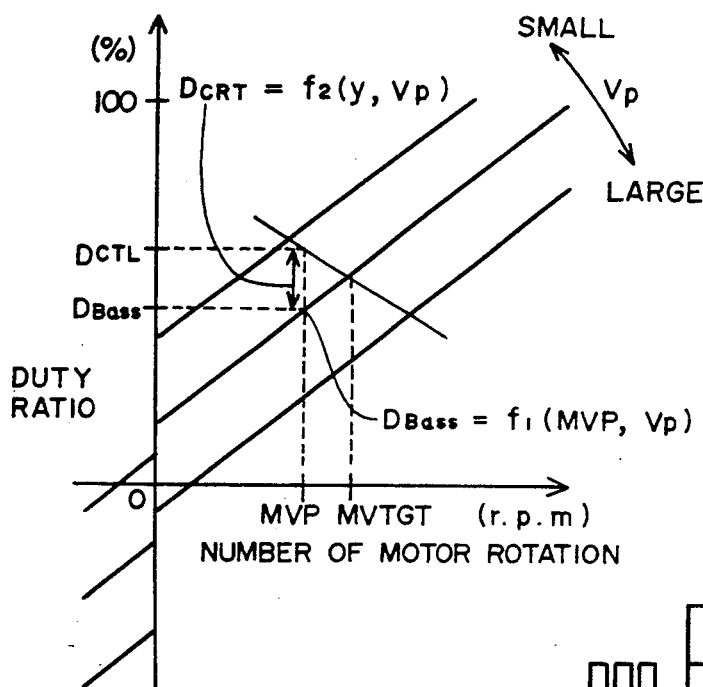
FIG. 11 is a graph which shows a relationship between the rotational speed, the battery voltage, and the duty ratio.
Figure 10:
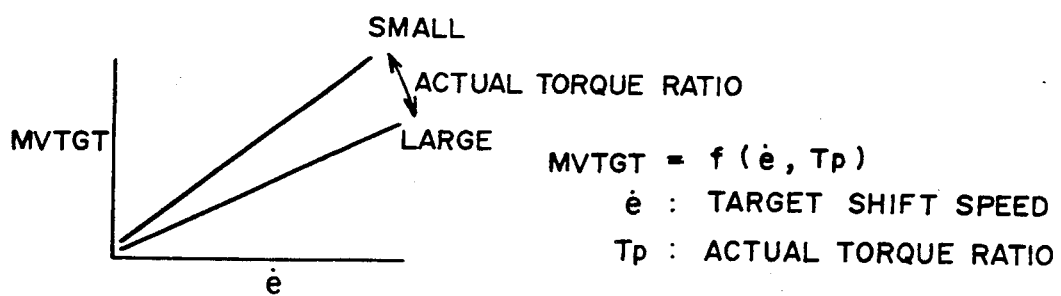
FIG. 10 is a graph which shows a relationship between the target rotational speed, the actual torque ratio, and the target shift speed as map data.

This processing is shown in a flow chart of FIG. 9. The calculation of the target number of motor rotation MVTGT is calculated using map data the elements of which data are the target shift speed ė and the actual torque ratio $T_p$, as shown in a graph of FIG. 10. FIG. 11 is a graph which shows the relationship of the number of motor rotation and the duty ratio outputted to the driver for driving motor shown in FIG. 12.

After this processing, in the main flow shown in FIG. 4, solenoid for controlling back pressure controlling processing which is to control the back pressure of the accumulator is conducted according to the condition of the throttle opening, shift position, and the oil temperature.

Then, at last, solenoid for locking up controlling processing which is to control the solenoid for locking up is conducted according to the number of primary sheave rotation, the number of engine rotation, the throttle opening, and the oil temperature, and the main flow reaches the end.

As described above, according to an ECU of the present embodiment, the target torque ratio is set according to the road surface condition regardless of the vehicle speed, an effect can be obtained that, especially when the vehicle is on a low-$\mu$ road and starts to move, the torque ratio of the continuous transmission is lowered, the driving force which acts on the driving wheels of the vehicle is lowered, and a skid is prevented.

Figure 13:
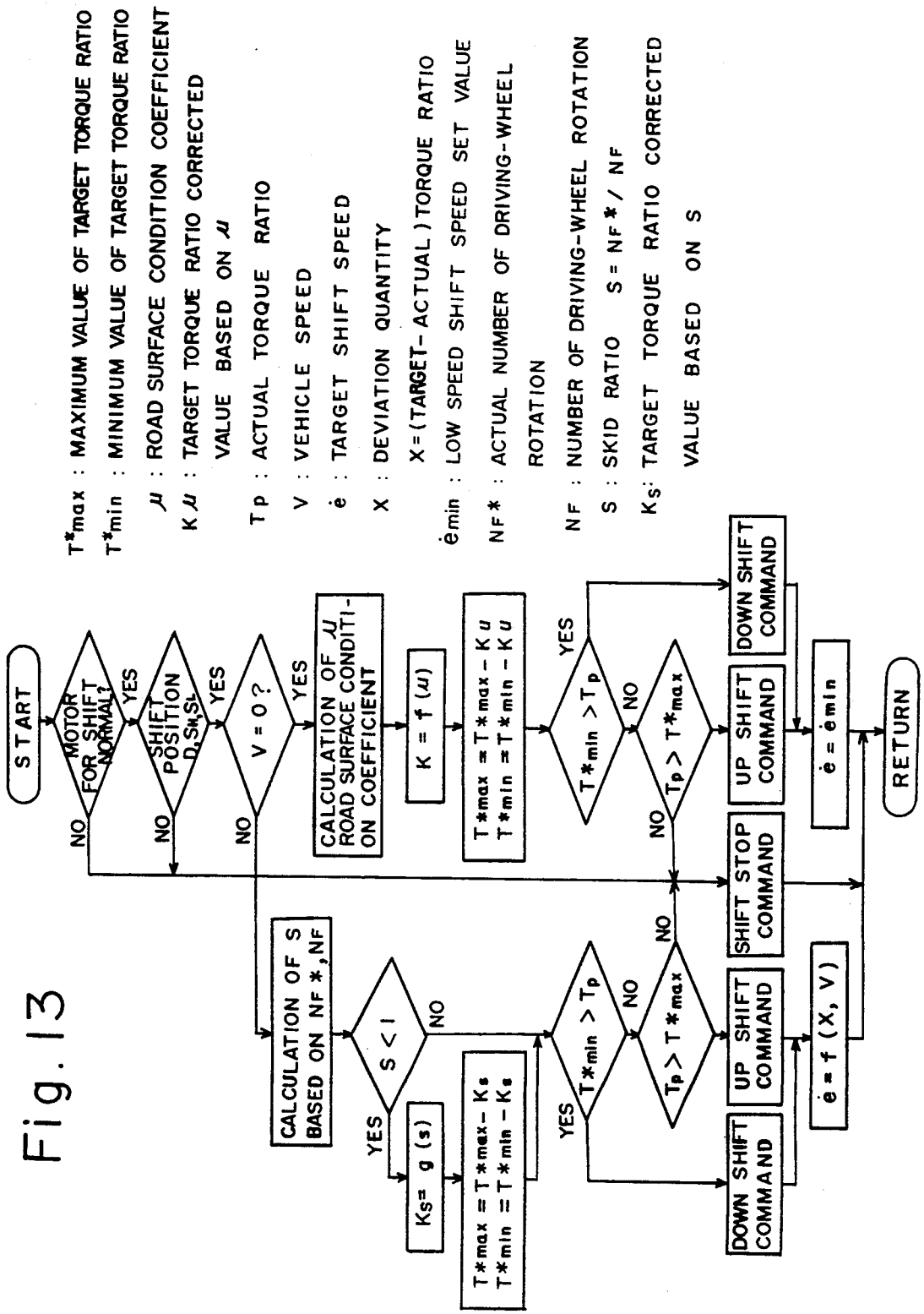
FIG. 13 is a flow chart which shows CVT shift judging processing of a control unit as another embodiment of the present invention.

The above is a detailed description of the present invention according to one embodiment. It is needless to say, however, that the present invention is not limited to the above embodiment and can be embodied with various modifications of the arrangement which fall within the scope of the present invention. Especially, in the above description, the example of correcting the shift ratio is only by detecting the low-$\mu$ road, but it may be that the system is combined with a conventional system which corrects the shift ratio by detecting a skid. When the two systems are jointly applied, for example, as shown by alternate long and two short dashes lines in FIGS. 1 and 3 and as shown as an additional element in the above embodiment, an actual vehicle speed sensor and an actual vehicle speed detecting portion may be provided the output of which is inputted to the CVT transmission judging portion. As a processing flow in a CVT transmission judging portion of this arrangement, for example, one shown in FIG. 13 can be supposed.

What is claimed is:

1. A control system for controlling the torque ratio of a vehicular continuously variable transmission to maintain a target torque ratio, said continuously variable transmission including two pairs of axle-mounted sheaves with a drive belt therebetween and a motor for moving one sheave of one pair relative to the other sheave of said one pair, thereby changing the torque ratio, said control system comprising:
   primary rotation detecting means for detecting an input rotational speed;
   secondary rotation detecting means for detecting an output rotational speed;

actual torque ratio calculation means for calculating an actual torque ratio based on the detected input rotation and the detected output rotation;

a throttle opening detector for detecting throttle opening and for generating a throttle opening signal representative of the detected throttle opening;

target torque calculating means for calculating a target torque ratio based on said throttle opening signal;

road surface condition indicating means for indicating a low-$\mu$ road surface condition and for generating a road surface condition signal; and shift judgement means for correcting the target torque ratio in accordance with the road surface condition signal and for outputting a shift command signal to the motor based on the corrected target torque ratio and the actual torque ratio.

2. A control system according to claim 1 wherein said road surface condition indicating means is a road surface sensor for detecting a low-$\mu$ surface condition.

3. A control system according to claim 1 wherein said road surface condition indicating means is a road surface condition selecting means for manually selecting a road surface coefficient and for generating said road surface condition signal in accordance with said selected coefficient.

4. A control system according to claim 1, wherein said road surface condition indicating means is a manual switch.

5. A control system according to claim 1 wherein said primary rotation detecting means is a sensor for detecting the rotational speed of one of said two pairs of axle-mounted sheaves and said secondary rotation detecting means is a sensor for detecting the rotational speed of the other of said two pairs of axle-mounted sheaves.

6. A control system according to claim 1, further comprising:
shift speed determination means for determining a target shift speed and for generating a target shift speed signal;
a vehicle speed sensor for sensing vehicle speed, said shift speed determination means setting a low target shift speed responsive to detection of zero vehicle speed;
shift speed control means for controlling the motor to provide a target shift speed responsive to the target shift speed signal.

7. A control system according to claim 2, further comprising:
shift speed determination means for determining a target shift speed and for generating a target shift speed signal;
a vehicle speed sensor for sensing vehicle speed, said shift speed determination means setting a low target shift speed responsive to detection of zero vehicle speed;
shift speed control means for controlling the motor to provide a target shift speed responsive to the target shift speed signal.

8. A control system according to claim 3, further comprising:
shift speed determination means for determining a target shift speed and for generating a target shift speed signal;
a vehicle speed sensor for sensing vehicle speed, said shift speed determination means setting a low target shift speed responsive to detection of zero vehicle speed;
shift speed control means for controlling the motor to provide a target shift speed responsive to the target shift speed signal.

9. A control system according to claim 4, further comprising:
shift speed determination means for determining a target shift speed and for generating a target shift speed signal;
a vehicle speed sensor for sensing vehicle speed, said shift speed determination means setting a low target shift speed responsive to detection of zero vehicle speed;
shift speed control means for controlling the motor to provide a target shift speed responsive to the target shift speed signal.

* * * * *

UNITED STATES PATENT AND TRADEMARK OFFICE
CERTIFICATE OF CORRECTION

PATENT NO. : 5,218,541

DATED : June 8, 1993

INVENTOR(S) : SAKAKIBARA et al

It is certified that error appears in the above-indentified patent and that said Letters Patent is hereby corrected as shown below:

Col. 2, line 12, "automatical" should read --automatically--.

Col. 4, line 7, "provide" should read --provided--.

Col. 5, line 35, after "inputted" insert a comma --,--; and line 62, "$A_g$" should read --$A_9$--.

Col. 6, line 2, "$t_s$" should read --$t_e$--.

Col. 8, line 19, "shaft" should read --shift--.

UNITED STATES PATENT AND TRADEMARK OFFICE
CERTIFICATE OF CORRECTION

PATENT NO.   : 5,218,541
DATED        : June 8, 1993
INVENTOR(S)  : SAKAKIBARA et al It is certified that error appears in the above-indentified patent and that said Letters Patent is hereby corrected as shown below:

Col. 9, line 35, "the maximum the minimum" should read --the maximum/the minimum--.

Signed and Sealed this

Nineteenth Day of April, 1994

Attest:

BRUCE LEHMAN

Attesting Officer        Commissioner of Patents and Trademarks